(12) United States Patent
Bright et al.

(10) Patent No.: US 6,912,389 B2
(45) Date of Patent: Jun. 28, 2005

(54) INTERWORKING AND INTEROPERABILITY OF GPRS SYSTEMS WITH SYSTEMS OF OTHER TECHNOLOGY FAMILIES

(75) Inventors: Penny Lynne Bright, Naperville, IL (US); Douglas Harold Rollender, Bridgewater, NJ (US); Kamal K. Verma, Darien, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 660 days.

(21) Appl. No.: 09/871,432

(22) Filed: May 31, 2001

(65) Prior Publication Data

US 2002/0094811 A1 Jul. 18, 2002

Related U.S. Application Data

(60) Provisional application No. 60/261,588, filed on Jan. 12, 2001.

(51) Int. Cl.[7] .............................................. H04Q 7/20
(52) U.S. Cl. ................. 455/433; 455/466; 455/435.1; 455/435.2; 370/466; 370/467
(58) Field of Search ............................... 455/433, 414, 455/435, 436, 561, 426, 466, 446; 370/352, 338, 466, 467

(56) References Cited

U.S. PATENT DOCUMENTS

| 5,862,481 | A | | 1/1999 | Kulkarni et al. ............. 455/432 |
|---|---|---|---|---|
| 5,933,784 | A | | 8/1999 | Gallagher et al. ........... 455/552 |
| 6,119,021 | A | * | 9/2000 | Katz ............................ 455/561 |
| 6,389,008 | B1 | * | 5/2002 | Lupien et al. ............... 370/352 |
| 6,463,055 | B1 | * | 10/2002 | Lupien et al. ............... 370/353 |
| 6,546,247 | B1 | * | 4/2003 | Foti et al. .................... 455/433 |
| 6,577,723 | B1 | * | 6/2003 | Mooney ................. 379/221.08 |
| 6,636,491 | B1 | * | 10/2003 | Kari et al. ................... 370/328 |
| 6,741,704 | B1 | * | 5/2004 | Virtanen ...................... 380/247 |
| 2002/0006797 | A1 | * | 1/2002 | Virtanen et al. ............. 455/445 |
| 2002/0118670 | A1 | * | 8/2002 | Kari ............................. 370/352 |
| 2002/0137500 | A1 | * | 9/2002 | Brooking et al. | |

FOREIGN PATENT DOCUMENTS

| GB | 2301732 A | 11/1996 |
|---|---|---|
| WO | WO 99/63774 | 12/1999 |
| WO | WO 00/56091 | 9/2000 |
| WO | WO 00/56110 | 9/2000 |
| WO | WO 00/79804 A2 | 12/2000 |

OTHER PUBLICATIONS

Uchiyama, Y, et al: "Network Functions and Signalling for Personal Roaming between Digital Cellular Standards." 1995 Fourth IEEE International Conference on Universal Personal Communication Record. Gateway to the 21st Century. Toyoko, Nov. 6–10, 1995, IEEE International Conference on Personal Communications, New York, IEEE, US, vol. Conf. 4, Nov. 6, 1995, pp. 447–451, XP010160579 ISBN: 0–7803–2955–4.

* cited by examiner

Primary Examiner—Charles Appiah
Assistant Examiner—Joy Contee

(57) ABSTRACT

A GPRS interworking and interoperability function (IIF) is interposed between a serving GSM/GPRS wireless system and a second wireless system of a different technology family to allow a mobile station homed to the second wireless system to operate in the GSM/GPRS system. The IIF executes or emulates the behavior of a GPRS HLR when communicating with the GSM/GPRS system, and executes or emulates the behavior of an MSC/VLR of the home system technology family when communicating with the home system. When a mobile station registers in the serving system, the MSC/VLR portion of the IIF transmits a registration notification message to the home system HLR specifying the address of an associated SGSN as though it were an MSC.

14 Claims, 6 Drawing Sheets

ANSI/DW FOREIGN MODE

GSM FOREIGN MODE

TDMA (OR OTHER DW) CALL DELIVERY ATTEMPT WHEN GPRS-ONLY OR GPRS AND GSM REGISTERED

INTERWORKING AND INTEROPERABILITY OF GPRS SYSTEMS WITH SYSTEMS OF OTHER TECHNOLOGY FAMILIES

CROSS REFERENCE TO RELATED APPLICATION

This application claims priority of Provisional Application Ser. No. 60/261,588, filed Jun. 12, 2001.

FIELD OF THE INVENTION

This invention relates to telecommunications systems, and more particularly to systems and methods for providing interworking and interoperability of certain services between telecommunications systems employing technology families that differ in air-interface, call model, or other protocols.

BACKGROUND OF THE INVENTION

Many wireless telecommunication subscribers desire to use their wireless terminals in conjunction with telecommunications systems other than their home systems. Subscribers also desire to obtain access to telecommunications services using their existing subscriptions, which access may be independent of their normal telecommunications terminals, through telecommunications systems other than their home systems. Frequently, the need for this occurs while the subscriber is travelling or otherwise outside the service area of their home system. Accordingly, telecommunications systems manufacturers and system operators have developed facilities to permit subscribers to receive services using their telecommunications terminals and subscriptions via a system which may not be the subscriber's home system, provided that the terminal and the serving system are compatible. This feature is often referred to as "roaming".

Serving roaming subscribers is challenging even when the serving system and home system employ identical technologies. However, where the serving system is implemented using air interface and/or call model technology families that differ from those used in the home system, special challenges arise in providing interworking between such systems due to fundamental differences in message protocols, call models, and the basic structure and facilities of the underlying systems. Moreover, these differences are exacerbated over time as new technologies are introduced into networks containing a range of legacy technologies, and the old and new technologies are required to interwork.

FIG. 1 depicts a known arrangement 100 for the interconnection of selected components of two wireless systems: a "serving" system 110 using one of the conventional North American wireless technologies (such as Analog Cellular (AMPS), TDMA, CDMA, etc.); and a "home" GSM system 112. The term "domestic wireless" (DW) is intended to refer to any of the wireless air interface and call model standards used in North America, including but not limited to those mentioned above. The components shown are selected to illustrate those needed for certain interworking between the systems in order to provide, within the service area of the "serving" domestic-wireless-type system 110, service to a DW mobile station (MS) 114 having a home subscription on the GSM system 112. It will be appreciated that both the serving DW system 110 and the home GSM system 112 have voice capabilities. Typically, the mobile station 114 would be a dual mode terminal which is compatible with one or more of the DW standards (other than GSM) and which is also compatible the GSM standard. The mobile station 114 would communicate with a DW MSC/VLR via a radio link 118, radio base station equipment (not shown), and links connecting the base station equipment to the MSC/VLR 116. The broken line 120 denotes the boundary between the two systems 110 and 112. In order to provide interworking between the systems, the DW system 110 must communicate with the GSM system 112. As is known in the art, the GSM system 112 may provide an Interworking and Interoperability Function (IIF) 122 comprising an HLR emulation function 124 compatible with the DW system 110, connected to a GSM MSC/VLR emulation function 126. The term "function" as applied to these elements is intended to be equivalent to "functional component." The IIF 122 is connected to the DW MSC/VLR 116 via suitable signaling links, which may optionally include a Signal Transfer Point (STP) 128.

The HLR emulation function 124 of IIF 122 appears to the DW MSC/VLR 116 as any other DW HLR, in that it appears to provide the functions of such an HLR more or less transparently to the DW MSC/VLR 116. The GSM MSC/VLR component of 126 the IIF 122 similarly appears within the GSM network 112 as any other GSM MSC/VLR. The GSM MSC/VLR 126 is connected to a GSM HLR 130. Thus, the IIF 122 provides signaling protocol, call model, and other necessary translations to permit the DW MSC/VLR 116 to perform normal registration, call processing and other transactions with the IIF 122. To the extent the IIF 122 needs information or other resources from the GSM network 112 in order to perform the functions of a DW HLR, the GSM MSC/VLR component 126 may maintain those resources directly or may request them from other elements, such as the GSM HLR 130.

As is known in the art, the MS 114 may register (message 132) with the DW MSC/VLR 116, and the DW MSC/VLR 116 will propagate a suitable Register Notification message 134 (or messages 134a and 134b if a STP 128 is used) to the IIF 122, which will perform any necessary translations, and further propagate resulting GSM protocol registration messages 136 to the GSM HLR 130. Any acknowledgements (not shown) may be similarly be passed and translated in the opposite directions.

FIG. 2 depicts an arrangement 200 similar to that of FIG. 1, except that the serving system 210 and home-system 212 are reversed. That is, in FIG. 2, the serving system 210 is a GSM system and the home system is a DW 212 system. It will be appreciated that both the serving GSM system 210 and the home DW system 212 have voice capabilities. The MS 214, which may be a dual-mode or multiple-mode mobile, or may be a GSM-only mobile containing a Subscriber Identity Module (SIM) corresponding to the subscriber's home DW subscription, may register (message 232) using normal GSM protocols. The GSM MSC/VLR 216 transmits, e.g., a Location Update message 234 to the Interworking and Interoperability Function (IIF) 222.

The IIF 222 of FIG. 2 contains a GSM HLR (or suitable emulator) 224, and a DW MSC/VLR (or suitable emulator) 226. The DW MSC/VLR 226 translates the message as necessary to employ DW protocols (e.g., it may prepare a suitable Register Notification message 236), and transmits it to the DW HLR 230. In this case, because the GSM authentication function is complex and not supported by the DW HLR 230, the GSM HLR 224 must also perform the authentication function. However, the DW HLR 230 may perform the other customary functions associated with registration of the mobile station. Any acknowledgements 238 produced by the DW HLR 230 may be transmitted and translated in the opposite direction.

As is known in the art, a call to the MS 214 while roaming in the GSM system 210 would be initially delivered to the home DW MSC/VLR (not shown), which would consult the DW HLR 230 to determine the location of the MS 210 and provide routing information needed to extend the call to the GSM MSC/VLR 216 for ultimate delivery. In this case, the DW HLR 230 will query the DW MSC/VLR emulating component 226 of the IIF 222 for a Temporary Local Directory Number (TLDN) and the IIF 222 will query the GSM MSC/VLR 216 for a Mobile Subscriber Roaming Number (MSRN). The IIF 222 will send the received MSRN as the TLDN back to the home DW MSC/VLR for it to extend the call to the GSM MSC/VLR 234.

These processes assume that the mobile station 214 and GSM 210 network both have voice/circuit capabilities (although they may also have packet GPRS capabilities). In that case, the GSM HLR 224, the GSM MSC/VLR 216, and the DW HLR 230 are capable of providing traditional mobility management and other functions needed to provide telecommunications services to the mobile station 210, including termination of calls.

However, there may be situations in which a subscriber would be unable to obtain utilize voice/circuit services from a GSM system 210, but would desire to use GPRS services if they were available and roaming were possible. For example, a subscriber may be present in an area in which GPRS (i.e., packet data) service is available, but GSM service (i.e., circuit voice and data) is not available. Similarly, while travelling, there may be available to the subscriber a mobile station or terminal compatible with a GPRS system but not with a GSM system. For example, the mobile station may be a wireless Personal Digital Assistant lacking any voice capabilities.

Unfortunately, existing DW HLRs, such as DW HLR 230 of FIG. 2, are arranged to support circuit-switched voice or data devices only. Such DW HLRs are not equipped to accommodate registrations of terminals in GPRS- or packet-only mode or of terminals that have only GPRS or packet capabilities. Thus, existing DW HLRs are unaware of GPRS- or packet-only registrations. As a result, existing DW HLRs are unable to perform certain services in connection with GPRS- or packet-only mobile stations.

One service the existing DW HLR cannot perform is identification of a Serving GPRS Support Node (SGSN) in order to allow termination of an incoming Short Message Service message to the mobile station. Typically, such messages are initially directed to a Message Center element of the DW network, which element is connected to the DW HLR 230. In DW networks, mobile stations do not attempt packet-only registrations, but rather these mobile stations register in a manner compatible with the DW HLR 230. When a roaming GPRS- or packet-only terminal of a DW-native network registers in the GSM network 210, the DW HLR 230 in the home network 212 has no facility for accepting information about such registration, and in particular, has no facility for storing the identity of the serving GPRS SGSN. Accordingly, when an SMS message arrives at the Message Center of the DW network 212, the DW HLR 230 is unable to provide routing information to enable the SMS message to be forwarded to the serving SGSN for delivery to the mobile station.

OBJECT AND SUMMARY OF THE INVENTION

Accordingly, it is an object of the present invention to provide an interworking and interoperability function that minimizes the aforementioned disadvantages of the prior art systems.

According to an aspect of the present invention, there are provided telecommunications system components and methods for use therewith which allow interworking and interoperability of a serving GSM and/or GPRS system with certain "domestic wireless" systems such that a mobile station homed on such a domestic wireless system, but registered with the serving system in a GPRS-only mode, may receive services from the serving system. The term "domestic wireless" (DW) is intended to refer to non-GSM systems compatible with ANSI or equivalent standards for TDMA, CDMA, and analog cellular systems, as generally used in North America, or compatible with other similar systems. The system includes a GPRS interworking and interoperability functional component (hereafter, IIF) that provides certain functions and services necessary for interworking and interoperability between the serving GPRS network and the home network.

The GPRS IIF includes a GPRS HLR component that provides the functions of a GPRS HLR, or emulates those functions, and interfaces with the serving GPRS system in a manner essentially indistinguishable from other GPRS HLRs. The GPRS IIF also includes a GPRS short message service-service center (SMS-SC) component which provides the functions of, or emulates, a regular SMS-SC. The GPRS IIF further includes an ANSI/DW mobile switching center/visitor location register (MSC/VLR) component that provides the functions of an ANSI/DW MSC/VLR, or emulates those functions, and interfaces with the home ANSI/DW system in a manner essentially indistinguishable from other ANSI/DW MSC/VLRs. The GPRS IIF further includes facilities for translating messages of the ANSI/DW system into functionally equivalent messages of the GSM/GPRS system, and vice versa, and for maintaining state information as needed to perform the translation between systems. The GPRS IIF may operate in cooperation with a GSM IIF, and in some embodiments, the functions of the GPRS IIF and the GSM IIF may be integrated or combined into a single IIF unit.

In accord with an aspect of the present invention, the GPRS IIF accommodates the registration or attachment by an ANSI/DW-homed mobile station onto a GSM/GPRS or GPRS-only system in a GPRS-only mode. The GPRS IIF detects that the subscriber is attaching to the GPRS network in a GPRS- or packet-only mode. The GPRS IIF responsively transmits to the DW HLR an appropriate registration notification message according to the circuit-switched protocol of the DW network, simulating the registration of a voice- or circuit-services-capable mobile station. In doing so, the GPRS IIF provides to the DW HLR the identity of an associated serving GPRS support node (SGSN) through which the mobile station registered, in a field normally used to identify the GSM mobile switching center/visitor location register (MSC/VLR) through which the mobile station registered. As a result, the DW HLR maintains information about the GPRS- or packet-only-registered mobile station as through it were a conventional voice- or circuit-services-capable mobile station which registered in the ordinary fashion. However, the DW HLR treats the subscriber as being registered to the MSC/VLR emulating component of the IIF. Thereafter, when a call delivery or SMS delivery attempt for the mobile station causes a query to the DW HLR, the DW HLR provides as the MSC identifier the address of the GPRS IIF/MSC/VLR associated with the SGSN, as earlier received from the IIF during the registration procedure.

According to a further aspect of the present invention, there is provided telecommunications system components and methods for use therewith which allow termination of an SMS-type message to a subscriber through a serving GPRS network, where the subscriber is homed to a network of a different technology family or protocol, and the subscriber is registered in a GPRS- or packet-only mode. When a call delivery or SMS delivery attempt for the mobile station causes a query to the DW HLR, the DW HLR provides as the MSC identifier the address of the GPRS IIF/MSC/VLR associated with the SGSN, as earlier received from the IIF during the registration procedure. All future messages associated with the mobile station and destined for an MSC/VLR, related to call delivery, SMS delivery, or message waiting notification, are routed to the IIF emulating the DW MSC/VLR. Such messages, where appropriate (e.g., if an SMS message or message waiting notification), are transmitted to the SGSN serving the MS. The GPRS IIF may itself generate or translate some such messages.

According to a further aspect of the invention, the serving telecommunications system may generate messages, indications, or events, which may be propagated as SMS messages to the mobile station as described above. In some cases, the messages, indications, or events, must be translated, e.g., by the IIF/MSC/VLR from a format of the DW serving system, into appropriate SMS message for use by the mobile for special functions, or for display to the user. For example, if the network receives a voice or circuit call destined for a MS registered in GPRS- or packet-only mode, the call cannot be delivered to the mobile. Accordingly, the call receives appropriate treatment, such as forwarding to a voice-mail system located on the DW home network. If the caller chooses to leave a voice-mail message, the voice-mail system may use a proprietary interface to inform the serving DW system's HLR of the message waiting condition. The DW HLR preferably transmits a Qualification Directive (QualDir) message (in the DW protocol) containing a message waiting indication to the IIF/MSC/VLR of the GSM/GPRS system. The IIF translates the message to an appropriate SMS message containing a message-waiting indication for use by the mobile station. The IIF transmits the message to the serving SGSN, which propagates it to the GSM mobile station. A similar process could occur if the mobile station is capable and registered for voice or circuit-services but GPRS-not-reachable for some reason. However, in that case, the SMS message may optionally be delivered via the serving GSM MSC instead of via the serving SGSN.

According to a further aspect of the invention, if a call delivery is attempted to the mobile station but cannot be delivered, e.g., because the mobile station has registered in GPRS- or packet-only mode, or because the serving network is incapable of delivering a voice or circuit call or services, the IIF may generate a missed call indication to be delivered to the mobile station. The IIF prepares a Mobile-Terminating Forward Short Message (MT-FSM) message containing appropriate text. For example, the message may mention the missed call and the calling party number, the calling party name, or other similar information that may be useful to the called party. The message is delivered as other SMS messages may be. Note that it is conceivable that a GSM HLR could also generate such an SMS message to the subscriber when the subscriber misses a call due to a "subscriber not reachable" condition detected in or by the GSM HLR.

BRIEF DESCRIPTION OF THE DRAWINGS

These and other features of the invention will be best understood by reference to the following detailed description of one or more exemplary embodiments of the invention, taken in conjunction with the accompanying drawings, in which.

DETAILED DESCRIPTION OF THE EXEMPLARY EMBODIMENTS

Figure 1:
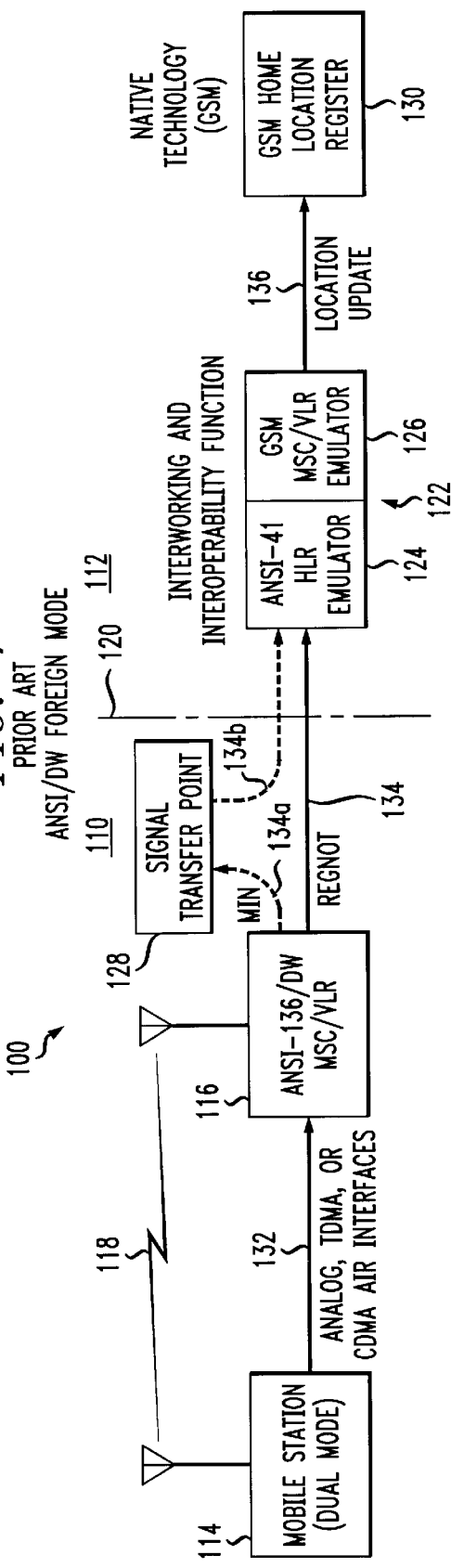
FIG. 1 is a block diagram of selected elements of interconnected networks, including a domestic wireless serving system and a GSM home system, showing a prior-art arrangement for interworking and interoperability between the systems.
Figure 2:
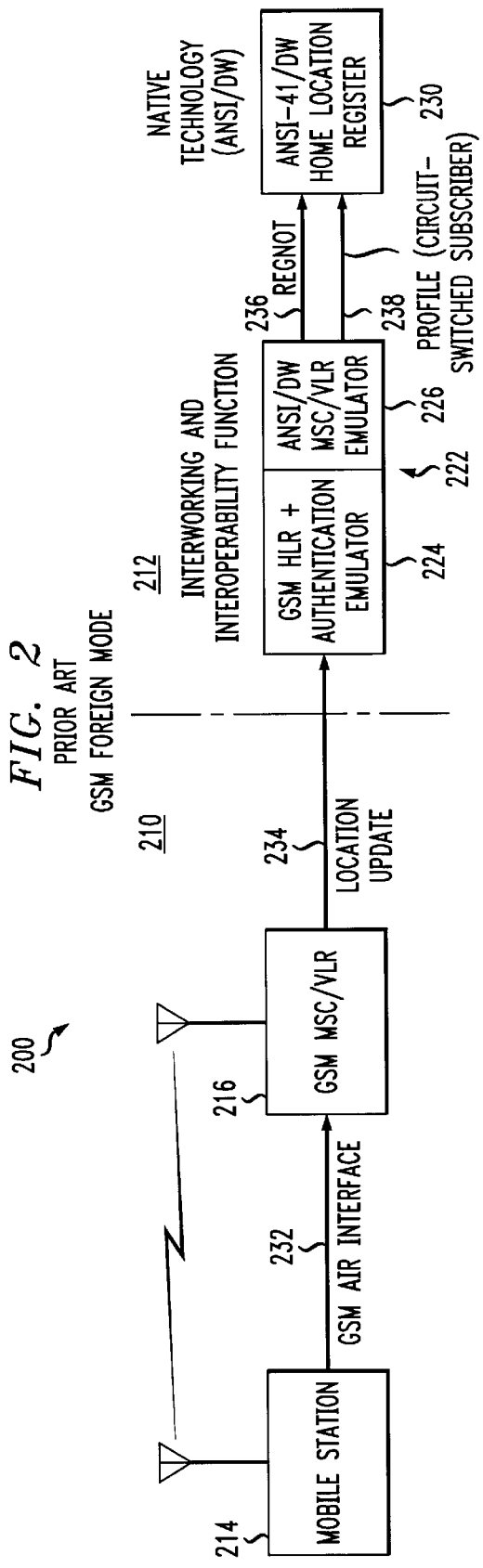
FIG. 2 is a block diagram of selected elements of interconnected networks, including a GSM serving system and a domestic wireless home system, showing a prior art arrangement for interworking and interoperability between the systems.

A telecommunications system constructed according to an aspect of the present invention may, in various embodiments, provide communications bearing voice signals, data, video, and any other content. Hereinafter, the term "call" is used herein to refer a session of information transfer between a set of subscriber terminals (or other endpoints) via a telecommunications system or network. The term "call" is intended to refer broadly to any type of call, service, connection, session, packet, or datagram, or any related group or stream thereof, regardless of media or content, and regardless of whether or not the communication is circuit, connection, or session oriented. Thus, the term "call" is intended to include, but not be limited to traditional circuit voice calls, packet voice calls, circuit data calls, connectionless calls, or packet data calls, and multimedia variants thereof.

The present application relates to telecommunications systems, including multimedia telecommunications systems, which may be implemented using a variety of electronic and optical technologies, including but not limited to: analog electronic systems; digital electronic systems; microprocessors and other processing elements; and software and other embodied collections of steps, instructions, and the like, for implementing methods, processes, or policies in conjunction with such systems and processing elements. The embodiments described herein are exemplary. Thus it will be appreciated that although the embodiments are described in terms of specific technologies, other equivalent technologies could be used to implement systems in keeping with the spirit of the present invention.

It will be appreciated that in the telecommunications arts, various signal leads, busses, data paths, data structures, channels, buffers, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

According to an aspect of the present invention, there are provided telecommunications system components and methods for use therewith which allow interworking and interoperability of a serving GSM and/or GPRS system with certain "domestic wireless" systems such that a mobile station homed on such a domestic wireless system, but registered with the serving system in a GPRS-only mode, may receive services from the serving system. The term "domestic wireless" (DW) is intended to refer to non-GSM systems compatible with ANSI or equivalent standards for TDMA, CDMA, and analog cellular systems, as generally used in North America, or compatible with other similar systems. The system includes a GPRS interworking and interoperability functional component (hereafter, IIF) that provides certain functions and services necessary for interworking and interoperability between the serving GPRS network and the home network.

Figure 3:
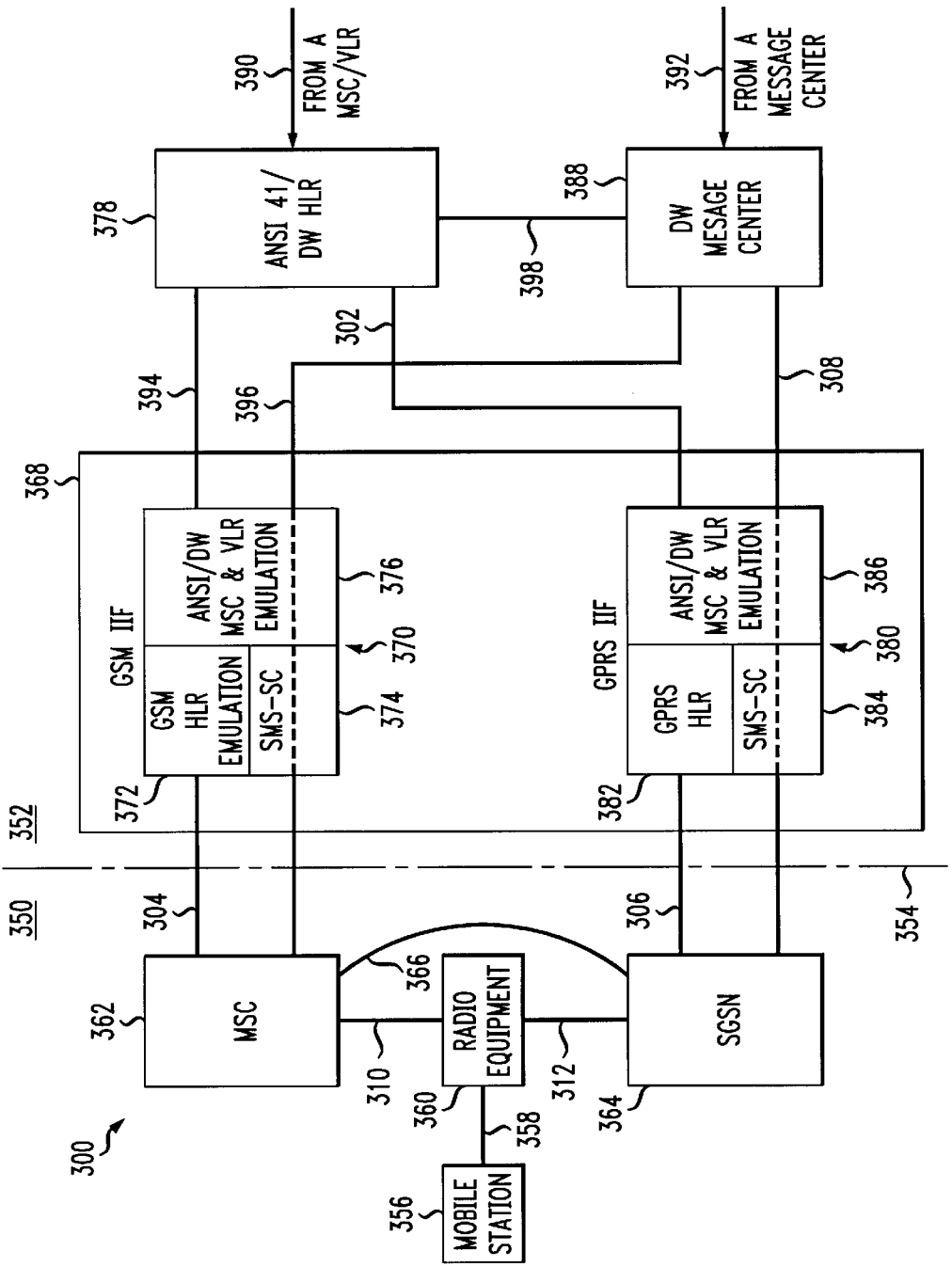
FIG. 3 is a block diagram of selected elements of interconnected networks, including a GSM and GPRS serving system and a domestic wireless home system, showing a first exemplary embodiment 300 constructed according to an aspect of the present invention for interworking and interoperability between the systems.

FIG. 3 is a block diagram showing a first exemplary embodiment 300 including selected network elements arranged in accord with the present invention. A GSM and GPRS serving system 350 is connected to a domestic wireless (DW) home system 352. The broken line 354 represents the boundary between the two systems 350 and 352. A mobile station (MS) 356 compatible with serving system 350, but homed to the DW home system 352, is present in the coverage area of the serving system 350. The MS 356 communicates with radio equipment 360 of the serving system 350 via a radio link 358. The radio equipment is connected to a GSM mobile switching center 362 via a link 310 and to a GPRS serving GPRS support node (SGSN) 364 via a link 312. MSC 362 and SGSN 364 each may be connected to one or more counterpart elements (not shown), which elements may be part of serving system 350 or part of other systems of the same technology family. MSC 362 and SGSN 364 may be implemented using any suitable components conforming to GSM and GPRS standards.

As best seen in FIG. 3, the DW home system 352 comprises a GPRS interworking and interoperability function (GPRS IIF) 380, a GSM interworking and interoperability function (GSM IIF) 370, an ANSI/DW home location register (HLR) 378, and a DW message center 388. The ANSI/DW HLR 378 is connected to the GSM IIF 370 via a link 394 and to the GPRS IIF 380 via a link 302. The DW message center 388 is connected to the GSM IIF 370 via a link 396 and to the GPRS IIF 380 via a link 308. The ANSI/DW HLR 378 and the DW message center 388 are interconnected via a link 398. The ANSI/DW HLR 378 and the DW message center 388 may be implemented using any suitable components conforming to the standard of the DW home system 352. The ANSI DW HLR 378 is preferably connected to one or more other MSC/VLRs (not shown) via a link 390 in order that it may exchange traffic with the other MSC/VLRs. The DW message center 388 is preferably connected to one or more other message centers (not shown) via a link 392 in order that it may exchange traffic with the other message centers.

The GPRS IIF 380 includes a GPRS HLR component 382 that provides the functions of a GPRS HLR, or emulates those functions, and interfaces with the serving GPRS/GSM system 350 in a manner essentially indistinguishable from other GPRS HLRs. The GPRS IIF 380 also includes a GPRS short message service-service center (SMS-SC) component 384 which provides the functions of, or emulates, a regular SMS-SC. Accordingly, the GPRS HLR component 382 is connected to SGSN 364 via a link 306, and the GPRS SMS-SC 384 is connected to SGSN 364 via a continuation of link 308. The GPRS IIF 380 may also have a standard Gc interface (not shown) to a Gateway GPRS Support Node (GGSN) (not shown).

The GPRS IIF 380 further includes an ANSI/DW mobile switching center/visitor location register (MSC/VLR) component 386 that provides the functions of an ANSI/DW MSC/VLR, or emulates those functions, and interfaces with the home ANSI/DW system 352 in a manner essentially indistinguishable from other ANSI/DW MSC/VLRs. The aforementioned components of GPRS IIF 380 further include facilities for translating messages of the ANSI/DW system into functionally equivalent messages of the GSM/GPRS system, and vice versa, and for maintaining state information as needed to perform the translation between systems.

The GSM IIF 370 includes a GSM HLR component 372 that provides the functions of a GSM HLR, or emulates those functions, and interfaces with the serving GSM/GPRS system 350 in a manner essentially indistinguishable from other GSM HLRs. The GSM IIF 370 also includes a GSM short message service-service center (SMS-SC) component 374 which provides the functions of, or emulates, a regular SMS-SC. Accordingly, the GSM HLR component 372 is connected to MSC 362 via a link 304, and the GSM SMS-SC 374 is connected to MSC 362 via a continuation of link 396. The GSM IIF 370 further includes an ANSI/DW mobile switching center/visitor location register (MSC/VLR) component 376 that provides the functions of an ANSI/DW MSC/VLR, or emulates those functions, and interfaces with the home ANSI/DW system 352 in a manner essentially indistinguishable from other ANSI/DW MSC/VLRs. The aforementioned components of GPRS IIF 370 further include facilities for translating messages of the ANSI/DW system into functionally equivalent messages of the GSM/GPRS system, and vice versa, and for maintaining state information as needed to perform the translation between systems.

The GPRS IIF 380 preferably operates in cooperation with a GSM IIF 370, and in some embodiments, the functions of the GPRS IIF 380 and the GSM IIF 370 may be integrated or combined into a single IIF unit, illustrated as combined IIF 368.

In conjunction with exemplary embodiments 300 (discussed above) and 400 (discussed below), the mobile station 356 may occupy various states of registration in the serving system 350 and/or the home system 352. The mobile station's initial registration state, and any changes the mobile station 356 makes to its registration state, may affect the way further registration, call delivery, and message delivery are carried out. The following discussion considers the message flow and related steps required to accomplish registration, call delivery, and message delivery for each of four particular initial registration state scenarios.

In a first scenario, the DW-native MS 356 is idle and not registered on any network. When that MS registers on a GPRS network 350 (or more properly, the SGSN 364 thereof), a GPRS location update must performed and sent to the IIF component 382 emulating the GPRS HLR. The GPRS IIF 380 then pretends as if the MS 356 had just registered on a GSM MSC/VLR, and it sends a DW/ANSI-41 REGNOT to the DW/ANSI-41 HLR 378 (which records the IIF address as the MSC/VLR and VLR address).

Thereafter, call delivery attempts will result in the DW/ANSI-41 HLR 378 querying the GPRS IIF 380 (acting like a MSC/VLR in an ANSI-41 network). The GPRS IIF 380 will detect that the MS is GPRS-only attached, and thus reply with a "not reachable" type indication, and secondary treatment will occur (e.g. an announcement may be played, or the call may be forwarded). At that point in time, the IIF may generate an SMS message to the GPRS-only MS, indicating that the subscriber missed a call and indicating the calling party number of that call's originator.

All incoming SMS messages destined for the subscriber will be sent by the ANSI-41 MC 388 to the GPRS IIF 380 for conversion to GSM format if the subscriber is GPRS-attached. The Message Center 388 will query the DW/ANSI-41 HLR 378 which will inform the MC 388 to send a "Short Message Delivery Point-to-Point" (SMDPP) message to the GPRS IIF 380 (since the DWI/ANSI-41 HLR 378 operates as though the MS is registered on a MSC/VLR). The GPRS IIF 380 will then send the GSM-formatted SMS message (FSM) to the SGSN 364 (because the MS is packet-only registered. If the MS subsequently registers on a TDMA MSC/VLR, then that MSC/VLR will send a REGNOT to the DW/ANSI-41 HLR 378. The DW/ANSI-41 HLR 378 will then send a REGCANC to the GPRS IIF 380, which in turn will send a Cancel Location to the SGSN 364 (if GPRS attached).

In a second scenario, the DW-native MS 356 is currently registered on a GSM MSC/VLR, such as MSC/VLR 362. When the MS 356 registers on a GPRS network 350 (SGSN 364), a GPRS location update will be performed and sent to the IIF component 382 emulating the GPRS HLR. The IIF 368 does not need to pretend that the MS has just registered on a GSM MSC/VLR because the DW/ANSI-41 HLR 378 already has the IIF address as the MSC/VLR and VLR address.

Thereafter, call delivery attempts will result in the DW/ANSI-41 HLR 378 querying the IIF 368, which acts like a MSC/VLR in an DW/ANSI-41 network. The IIF 368 will detect that the customer is both GSM circuit-switched attached and GPRS attached, and query the GSM MSC/VLR 362 as normal in the GAIT standard specifications. If the MS 356 missed the call due to a not reachable indication (which may occur either if so identified in the IIF 368, or if the GSM MSC/VLR 362 responds with a PRN error{absent subscriber} message), the IIF 368 may generate an SMS message to the MS 362, indicating that the subscriber missed a call and indicating the calling party number of that call's originator. The IIF 368 will determine whether to send the SMS message via the SGSN 364 or the MSC/VLR 362 for delivery.

All incoming SMS messages destined for the subscriber will be sent by the DW/ANSI-41 MC 388 to the IIF 368 for conversion to GSM format. The Message Center 388 will query the DW/ANSI-41 HLR 378, which will inform the MC 388 to send an SMDPP message to the IIF 368. (The DW/ANSI-41 HLR operates as though the MS 356 is registered on a MSC/VLR.) The IIF will then determine whether to send the GSM-formatted SMS message (FSM) to the SGSN or MSC/VLR. Because the MS 356 is registered both on GSM MSC/VLR 362 and GPRS SGSN 364, the IIF will determine an appropriate priority controlling the entity to which it will send the SMS message. For example, the GPRS SGSN 364 may have the highest priority, and the GSM MSC/VLR 362 may have the next priority. This priority may be overridden depending on whether the IIF detects that the MS is unreachable on one of the nodes. If the MS 356 subsequently registers on a TDMA MSC/VLR, then that MSC/VLR will send a REGNOT message to the DW/ANSI-41 HLR 378. The DW/ANSI-41 HLR 378 will then send a REGCANC message to the IIF 368, which in turn will send a Cancel Location message to the SGSN 380 (if GPRS attached).

In a third scenario, the DW-native MS 356 is currently registered on both a GSM MSC/VLR, such as MSC/VLR 362, and a GPRS SGSN such as SGSN 364. If the mobile station 356 performs a GSM-only detach, the IIF 368, which is emulating a GSM HLR, will not be notified. Accordingly, the IIF 368 and DW/ANSI-41 HLR 378 continue operating as though the MS 356 is registered on the DW/ANSI MSC/VLR-emulating component 376 of IIF 368. If however, the GSM MSC/VLR 362 sends a MS-Purged to the GSM HLR-emulating component 372 of IIF 368, the IIF 368 will remove the circuit-switched profile data stored. In addition, the IIF 68 will not send a ANSI-41 MS-inactive message to the DW/ANSI-41 HLR 378 because the HLR 378 must continue to operate as though that the MS is currently registered on a GSM MSC/VLR. If the MS 356 subsequently registers on the same or different GSM MSC/VLR, then the IIF 368 would need to send the HLR a REGNOT message in order to obtain the profile information. If the MS subsequently registers on a TDMA MSC/VLR, then that MSC/VLR will send a REGNOT message to the DW/ANSI-41 HLR 378, and the DW/ANSI-41 HLR 378 will send a REGCANC message to the IIF 368. The IIF 368 in turn will send a Cancel Location message to the GSM MSC/VLR 362 (if CS attached) and/or the SGSN 364 (if GPRS attached).

In a fourth scenario, the DW/ANSI-41-native MS 356 is idle and currently registered on a DW/TDMA MSC/VLR. The message exchange need to perform the registration portion of this scenario are discussed in greater detail below in connection with FIG. 5. Then the MS 356 registers on a GPRS network 350 (SGSN 364), a GPRS location update is be performed and sent to the GPRS HLR-emulating component 382 of GPRS IIF 380. The GPRS IIF 380 then pretends that the MS 356 has just registered on a GSM MSC/VLR. The GPRS IIF 380 sends an DW/ANSI-41 REGNOT message to the DW/ANSI-41 HLR 378. The DW/ANSI-41 HLR 378 records the address of GPRS IIF 380 as the MSC/VLR and VLR address.

Subsequent call delivery attempts will result in the DW/ANSI-41 HLR 378 querying the DW/ANSI-41 MSC/VLR-emulating component 386 of GPRS IIF 380. The GPRS IIF 380 detects that the MS is GPRS-only attached, and thus replies with a "not reachable" type indication. As a result, secondary call treatment will be applied (e.g. an announcement may be played, or the call may be forwarded). At that point in time, the GPRS IIF 380 generates an SMS message to the GPRS-only MS, indicating that the subscriber missed a call and indicating the calling party number of that call's originator.

All incoming SMS messages destined for the subscriber will be sent by the DW/ANSI-41 MC 388 to the GPRS IIF 380 for conversion to GSM format if the subscriber is GPRS-attached. The Message Center 388 will query the DW/ANSI-41 HLR 378 which will inform the MC 388 to send the SMDPP message to the GPRS IIF 380. (The DW/ANSI-41 HLR 380 continues to operate as though the MS 356 is registered on a MSC/VLR.) Because the MS 356 is packet-only registered, the GPRS IIF 380 will then transmit a GSM-formatted SMS message (FSM) to the SGSN 364. If the MS subsequently registers on a TDMA MSC/VLR, then that MSC/VLR will send a REGNOT message to the DW/ANSI-41 HLR 378. The DW/ANSI-41 HLR will send a REGCANC message to the GPRS IIF 380, which in turn will send a Cancel Location message to the SGSN 364 (if GPRS attached).

Figure 5:
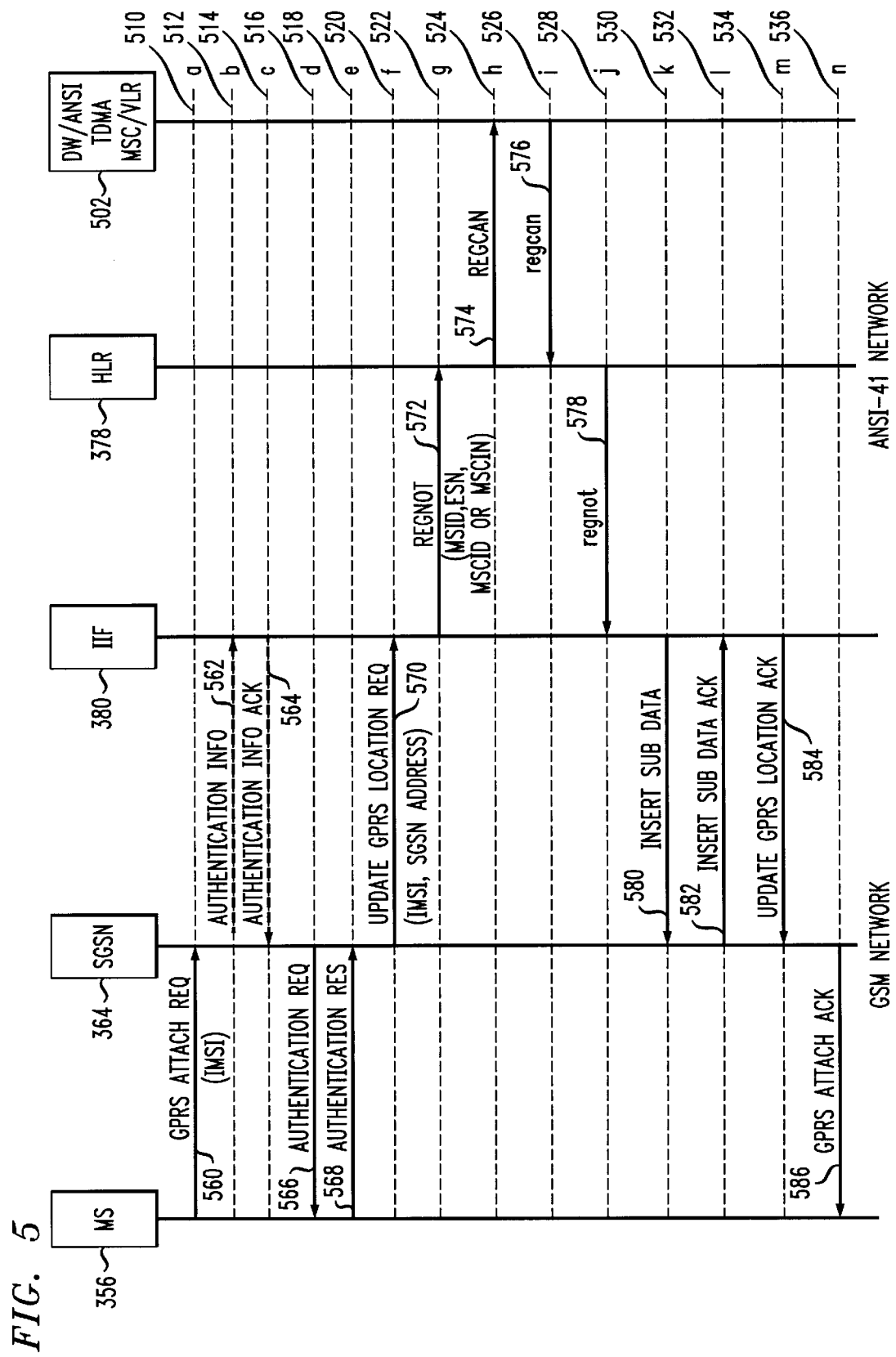
FIG. 5 is a message flow diagram depicting message generation and propagation steps for use in conjunction with the exemplary embodiments 300 and 400 of FIGS. 3 and 4, respectively, for registering a DW/ANSI-homed mobile station in a GPRS-only mode.

FIG. 5 depicts message flow when a mobile station, which has previously registered in a DW/ANSI-41 network, subsequently requests GPRS only service. When an ANSI-136 or other DW-native MS requests GPRS only service after having previously registered in a DW/ANSI-41 network, the MS performs a GPRS location update using its IMSI. In this case, the IIF emulates both a GPRS and GSM HLR/Authorization Center and a DW/ANSI-41 VLR. From the point of view of the subscriber's DW/ANSI-41 HLR, this situation is indistinguishable from one in which the subscriber has become registered on another ANSI-136 MSC/VLR.

In step 510, the MS 356 powers up and performs a GPRS Attach 560 in a GSM network. In step 512, if the Serving GPRS Support Node (SGSN) 364 does not have authentication information (authentication triplets) in order to perform authentication, it requests authentication information from the GPRS IIF 380 (message 562). The IIF emulates a GSM HLR/AuC in this case. In step 514, the GPRS IIF 380 returns the necessary authentication information (message 564). In step 566, the SGSN 364 initiates authentication (message 566) towards the MS 356.

In step 518, the MS 356 responds (message 568) to the authentication request. In step 520, the SGSN 364 initiates a GPRS location update towards the GPRS IIF 380. The Update Location Request message 570 contains the IMSI. In step 522, the GPRS IIF 380 validates whether the GPRS service request is authorized. The DW/ANSI-41 HLR can also authorize service. The GPRS IIF 380 emulates an DW/ANSI-41 VLR and issues an REGNOT INVOKE message 572 to the DW/ANSI-41 HLR 378 in order to remove the subscriber's associated circuit switch service registration from the TDMA MSC/VLR 502. If necessary, the subscriber IMSI in the Update Location Request is mapped to the associated MIN.

In step 524, the HLR 378 updates its location information and deletes the previous VLR record by sending a REGCANC message 574 to the previous VLR 502. In step 526, the VLR acknowledges the REGCANC in a message 576. In step 528, the HLR 378 returns the regnot acknowledgement message 578. Ordinarily, the GPRS IIF 380 does not need to store the profile data received in the regnot acknowledgement message 578, because the MS is only GPRS-attached (and the profile is circuit switching specific). However if some SMS-specific provisioned data from the ANSI-41 HLR is to be used for GPRS SMS, or if data is desired to be stored for subsequent GSM IIF usage (e.g., if the subscriber registers on an MSC), the IIF 368 may store the profile data.

In step 530, the GPRS IIF 380 (emulating a GPRS HLR) sends the GSM MAP Insert Subscriber Data message 580 towards the SGSN 364. This procedure is used to download subscriber data to the SGSN 364. Multiple Insert Subscriber Data transactions may be necessary to complete the transfer of subscriber data to the SGSN. In step 532, the SGSN 364 acknowledges the ISD Operation(s) using a message 582. In step 534, once the GPRS IIF 380 has received an acknowledgement to the Insert Subscriber Data operation, the GPRS IIF 380 returns an acknowledgement message 584 for the Update GPRS Location Request. In step 536, the SGSN 364 acknowledges the GPRS Attach request using a message 586.

According to a further aspect of the present invention, there is provided telecommunications system components and methods for use therewith which allow termination of an SMS-type message to a mobile station through a serving GPRS network, where the mobile station is homed to a network of a different technology family or protocol, and the mobile station is registered in a GPRS- or packet-only mode. When a call delivery or SMS delivery attempt for the mobile station causes a query to the DW HLR, the DW HLR provides as the MSC identifier the address of the GPRS IIF/MSC/VLR associated with the SGSN, as earlier received from the IIF during the registration procedure. All future messages associated with the mobile station and destined for an MSC/VLR, related to call delivery, SMS delivery, or message waiting notification, are routed to the IIF emulating the DW MSC/VLR. Such messages, where appropriate (e.g., if an SMS message or message waiting notification), are transmitted to the SGSN serving the MS. The GPRS IIF may itself generate or translate some such messages.

Figure 4:
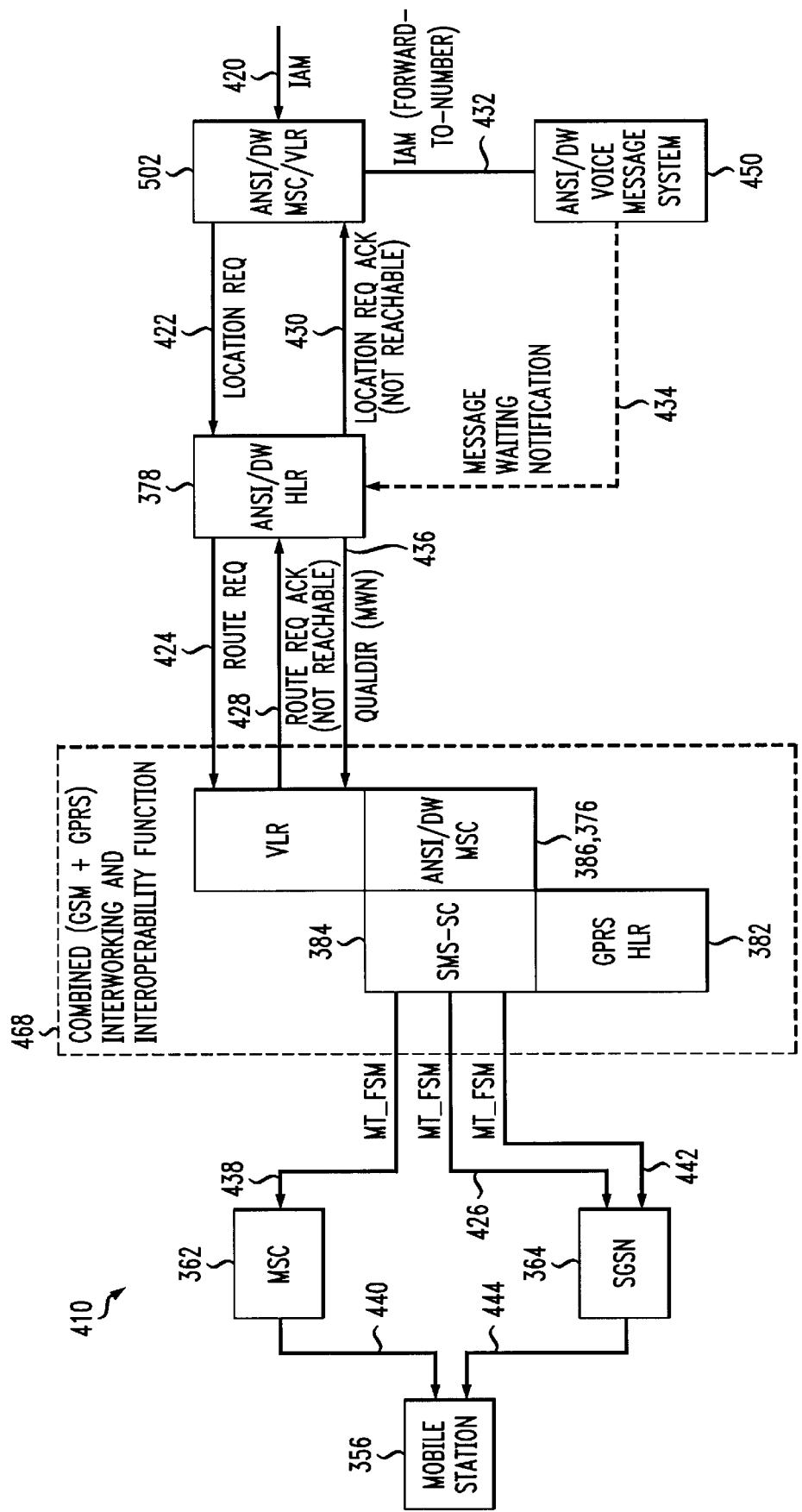
FIG. 4 is a combined block diagram/message flow diagram depicting a second exemplary embodiment 400 constructed according to an aspect of the present invention for interworking and interoperability between the systems, and further depicting message generation and propagation steps for use in conjunction with the exemplary embodiment 400 for handling an attempted call delivery to a DW/ANSI-homed mobile station when the station is initially registered in GPRS-only mode.
Figure 6:
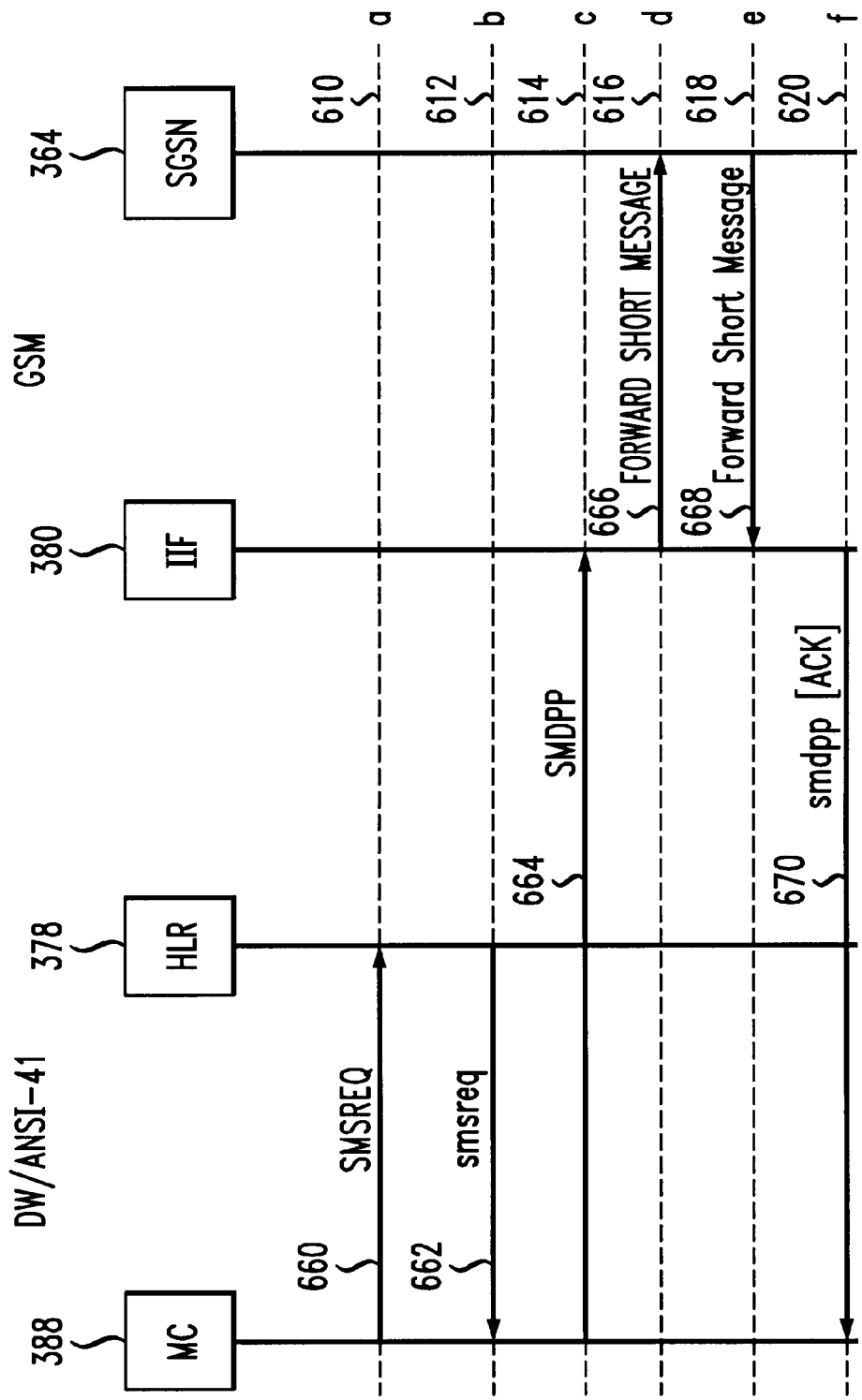
FIG. 6 is a message flow diagram depicting message generation and propagation steps for use in conjunction with the exemplary embodiments 300 and 400 of FIGS. 3 and 4, respectively, for delivering a message received by a DW/ANSI message center to a DW/ANSI-homed mobile station when the mobile station has registered in a GPRS-only or GSM/GPRS mode.

FIG. 6 is a message flow diagram depicting message generation and propagation steps for use in conjunction with the exemplary embodiments 300 and 400 of FIGS. 3 and 4, respectively, for delivering a message received by a DW/ANSI message center to a DW/ANSI-homed mobile station when the mobile station has registered in a GPRS-only mode. In step 610, the BW/ANSI-41 message center (MC) 388 transmits an SMSRequest Invoke message 660 to the HLR 378, including as arguments the MIN (MSISDN) of the mobile station and SMS Notification Indicator. In step 612, the HLR 378 determines whether the message should be forwarded to the MS and transmits a response to the MC 388 in a SMSRequest Return Result message 662, with the SMS_Address set to the IIF address (which may be a point code or E. 164 address).

In step 614, the MC 388 formats a Short-Message Delivery Point-to-Point (SMDPP) message 664 and transmits it to the GPRS IIF 380. Optionally, the message may take the form of a GSM-Hosted SMS Teleservice (GHOST) message encapsulated in the SMDPP message. In step 616, the GPRS IIF 380 builds a Forward Short Message (FSM) 666. If the message was in the GHOST format, the GPRS IIF 380 strips off the GHOST encapsulation. The IIF routes the FSM 666 to the SGSN 364 as a first choice.

Alternatively, the GPRS IIF 380 could send the FSM 666 to the GSM MSC. In some systems, the HLR may maintain a "mobile not reachable" flag which corresponds to a mobile station or subscription, and which may be activated under control of the subscriber. If that flag is set, then transmission of the FSM 666 to the GSM MSC would be inhibited.

In a further step (not shown), the SGSN 364 packages the information received in the FSM message 666 (referred to as GSM SMS RP-Data) into a CP-DATA message and delivers it across the GSM air interface to the mobile station. The mobile station acknowledges receipt of the CP-DATA and RP-DATA messages via CP-ACK and CP-ACK[RP-ACK], respectively. In step 618, upon successful receipt of the RP-ACK message from the mobile station, the SGSN 364 sends a positive acknowledgement Forward Short Message 668 back to the GPRS IIF 380. In step 620, the GPRS IIF 380 maps the received acknowledgement Forward Short Message 668 into a SMDPP Return Result message 670 and sends it to the MC 388.

According to a further aspect of the invention, the serving telecommunications system may generate messages, indications, or events, which may be propagated as SMS messages to the mobile station as described above. For example, messages destined for the mobile station may be generated as a consequence of a failed attempt to deliver a call to the mobile station. A message may be sent to the mobile to indicate there is a voice-mail message waiting, or to indicate that an attempted call to the mobile station was missed. In some cases, the messages, indications, or events, must be translated, e.g., by the IIF/MSC/VLR from a format of the DW serving system, into appropriate SMS messages for use by the mobile for special functions, or for display to the user.

FIG. 4 is a combined block diagram/message flow diagram depicting a second exemplary embodiment 400 constructed according to an aspect of the present invention for interworking and interoperability between the systems, and further depicting message generation and propagation steps for use in conjunction with the exemplary embodiment 400 for handling an attempted call delivery to a DW/ANSI-homed mobile station when the station is initially registered in GPRS-only mode. The embodiment 400 of FIG. 4 is highly similar to the embodiment 300 of FIG. 3, but in the embodiment 400, a single combined interworking and interoperability function 468 for both GSM and GPRS is provided.

As best seen in FIG. 4, a voice or circuit call arriving at the DW/ANSI MSC/VLR 502 may indicate in an initial address message (IAM) 420 that the call is destined for the mobile station 356. If the MS 356 is registered in GPRS- or packet-only mode, the call cannot be delivered to the mobile. Accordingly, the call receives appropriate treatment, such as forwarding to a voice-mail system 450 located on the DW home network. See forwarding IAM message 432. Messages 422–430 are conventional ANSI-41 call delivery messages.

If the caller chooses to leave a voice-mail message, the voice-mail system 450 may use a proprietary interface (see message waiting notification 434) to inform the serving DW system's HLR 378 of the message waiting condition. The DW HLR 378 preferably transmits a Qualification Directive (QualDir) message 436 (in the DW protocol) containing a message waiting indication to the IIF/MSC/VLR 468, 386 and 376 of the GSM/GPRS system. The IIF 468 translates the message to an appropriate SMS message 442 containing a message-waiting indication for use by the mobile station 356. The IIF 468 transmits the message 442 to the serving SGSN 364, which propagates it to the GSM mobile station 356. A similar process could occur if the mobile station 356 is capable and registered for voice or circuit-services but unreachable for some reason. However, in that case, an SMS message 438 may optionally be delivered via the serving GSM MSC 362 instead of via the serving SGSN 364.

According to a further aspect of the invention, if a call delivery is attempted to the mobile station 356 but cannot be delivered, e.g., because the mobile station has registered in GPRS- or packet-only mode, or because the serving network is incapable of delivering a voice or circuit call or services, the IIF 468 may generate a missed call indication to be delivered to the mobile station 356. The IIF 468 prepares a Mobile-Terminating Forward Short Message (MT-FSM) message 426 containing appropriate text. For example, the message may mention the missed call and the calling party number, the calling party name, or other similar information that may be useful to the called party. The message is delivered as other SMS messages may be, as generally depicted in FIG. 4, and shown more particularly in FIG. 7. Note that it is conceivable that a GSM HLR could also generate such an SMS message to the subscriber when the subscriber misses a call due to a "subscriber not reachable" condition detected in or by the GSM HLR.

Figure 7:
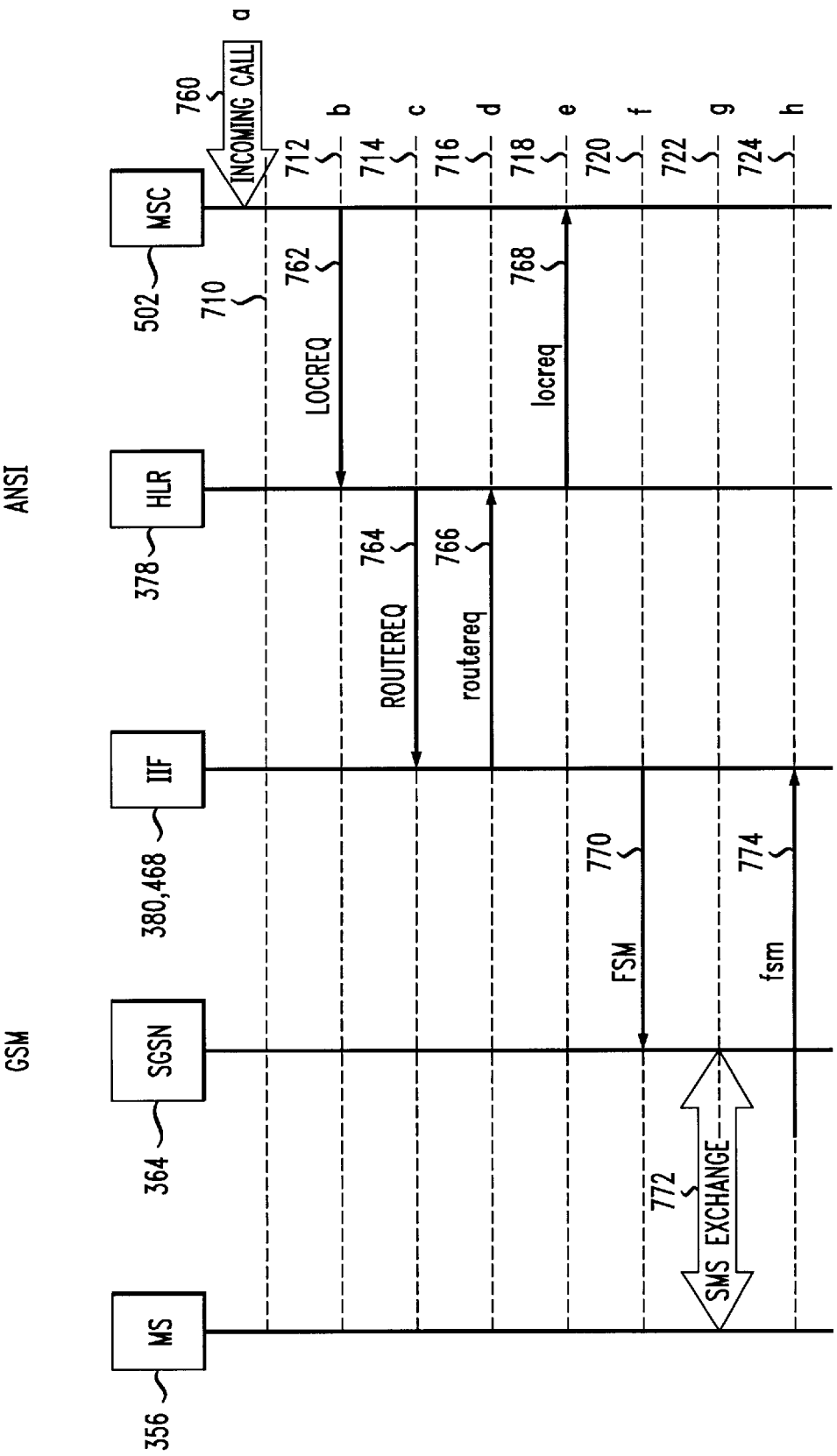
FIG. 7 is a message flow diagram depicting message generation and propagation steps for use in conjunction with the exemplary embodiments 300 and 400 of FIGS. 3 and 4, respectively, for generating and delivering to a DW/ANSI-homed mobile station registered in a GPRS-only mode an indication that a call destined for the mobile station has been missed.

FIG. 7 is a message flow diagram depicting message flow and associate message generation and propagation steps for use in conjunction with the exemplary embodiments 300 and 400 of FIGS. 3 and 4, respectively, for generating and delivering to a DW/ANSI-homed mobile station attached for GPRS-only services an indication that a call destined for the mobile station has been missed. The IIF 468 has already registered itself (as an ANSI-41 MSC/VLR) with the ANSI-41 HLR 378. Because the subscriber is attached for GPRS-only service, incoming calls are not deliverable to the subscriber.

In step 710, the DW/ANSI MSC/VLR 502 receives an incoming call 760 for the MS 356, which is roaming in the GSM network. In step 712, the DW/ANSI MSC/VLR 502 sends a LOCREC message 762 to the DW/ANSI HLR 378. In step 714, the HLR 378 has the address of the GPRS IIF 380 (acting as an ANSI-41 MSC/VLR) and sends a ROUTEREQ message 764 to the GPRS IIF 380.

In step 716, the IIF 468 recognizes that the addressed station is a GAIT subscriber roaming in a GSM network. The IIF, from its dynamic data, sees that the MS is attached for GPRS-only services and hence, cannot have call delivery. The IIF 468 sends a routreq message 766 with the field "AccessDeniedReason" set to "No Page Response." Other error or reason codes could also be used. In step 718, the HLR 378 returns a locreq message 768 to the DW/ANSI MSC/VLR 502. At this point, the calling party may receive secondary treatment.

The IIF 468 contains the functionality to act as a GSM SMS-SC. In this case, the IIF 468 has the calling party DN available (from the ROUTEREQ message 764). In step 720, the IIF 468 proceeds to act as an SMS-SC and sends an FSM SMS message 770 to the SGSN 364 with the calling party number of the missed call. In step 772, the SGSN 364 delivers an mobile-terminated FSM SMS message 772 containing the calling party's DN to the MS 356 and waits for an acknowledgement. In step 774, the SGSN 364 sends the FSM acknowledgement message 774 back to the IIF 468.

The above-described embodiment of the invention is merely one example of a way in which the invention may be carried out. Other ways may also be possible and are within the scope of the following claims defining the invention.

What is claimed is:

1. An interworking and interoperability function for use in joining a GPRS wireless system with a second wireless system of a different technology family comprising:

a first GPRS HLR emulation component adapted for connection to said GPRS wireless systems, said first GPRS HLR emulation component providing a GPRS HLR interface to a mobile station instead or an HLR in the GPRS system, the mobile station having wireless communications supplied by the second wireless system and having a home GPRS registration;

a second MSC/VLR emulation component adapted for connection to an HLR node of said second wireless system that utilizes a technology family being one of analog cellular, time division multiple access cellular, and code division multiple access cellular;

a message translation component operatively connected to said first and second emulation components and adapted to translate messages received at one of said emulation components into a form compatible with the other of said emulation components, the message translation component translating a first HLR service request from the mobile station that is of a form compatible with the first wireless system into a second HLR service request that is of a form compatible with the second wireless system;

the second MSC/VLR emulation component transmitting the second HLR service request to an HLR component of the second wireless system for servicing the second request.

2. The apparatus of claim 1 further comprising an SMS-SC component adapted to duplicate the interface behavior of a short message service (SMS) service center of a GPRS system, said SMS-SC component being operatively connected to said GPRS HLR emulation component.

3. The apparatus of claim 2 wherein said SMS SC component is adapted for connection to a mobile switching center of said GPRS wireless system.

4. The apparatus of claim 2 wherein said SMS SC component is adapted for connection to a serving GPRS support node of said GPRS wireless system.

5. The apparatus of claim 1 further comprising an SMS-SC component adapted to duplicate the interface behavior of a short message service (SMS) service center of a GPRS system, said SMS-SC component being operatively connected to said MSC/VLR emulation component.

6. The apparatus of claim 1 wherein said second MSC/VLR emulation component is adapted for connection to a message center of said second wireless system.

7. The apparatus of claim 1 wherein said interworking and interoperability function further comprises a GPRS authentication center.

8. For use with an interworking and interoperability function joining a first GPRS wireless system with a second wireless system of a different technology family, a method of processing a request to deliver a call to a mobile station having a GPRS-only attachment to said first GPRS wireless system, comprising the steps of:

receiving a request from the second wireless system for routing information required to deliver a call to said mobile station that has a home registration in the second wireless system where the second wireless system is one of analog cellular, time division multiple access cellular, and code division multiple access cellular;

determining that said call cannot be delivered to said mobile station by virtue of the mobile station's GPRS-only attachment to said first GPRS wireless system; and transmitting, in response to said determining step determining that the mobile station has a GPRS-only attachment to the first GPRS wireless system, an indication to said second wireless system indicating that said mobile station is unreachable.

9. The method of claim 8, further comprising the step of:
responsive to said determining step, transmitting to said first GPRS wireless system a message destined for said mobile station indicating that a call was received but not delivered.

10. The method of claim 8, further comprising the step of:
responsive to said determining step, transmitting to a GSM mobile switching center of said first GPRS wireless system a message destined for said mobile station indicating that a call was received but not delivered.

11. The method of claim 8, further comprising the step of:
responsive to said determining step, transmitting to a serving GPRS support node of said first GPRS wireless system a message destined for said mobile station indicating that a call was received but not delivered.

12. The method of claim 8, further comprising the steps of:

receiving from said second wireless system an indication that a voice mail message is available for the subscriber of said mobile station; and translating said indication into a message compatible with said first GPRS wireless system and destined for said mobile station; and transmitting said message to said first GPRS wireless system.

13. For use with an interworking and interoperability function joining a first GSM/GPRS wireless system with a second wireless system of a different technology family, a method of processing a request to deliver a call to a mobile station comprising the steps of: to receiving at the second wireless system a request to deliver a call to said mobile station, said mobile station having a home registration in the second wireless system and having initially a GPRS-only attachment to the GSM/GPRS wireless system, the second wireless system being one of analog cellular, time division multiple access cellular, and code division multiple access cellular;

determining that said call cannot be delivered to said mobile station by virtue of the mobile station's GPRS-only attachment to said first GSM/GPRS wireless system; and transmitting, in response to said determining step determining that the mobile station has a GPRS-only attachment to the first GPRS wireless system, an indication to said second wireless system indicating that said mobile station is unreachable.

14. The method of claim 13, further comprising the steps of:

receiving from said second wireless system an indication that a voice mail message is available for the subscriber of said mobile station;

translating said indication into a first message compatible with said first GSM/GPRS wireless system, said first message destined for said mobile station;

determining that a current registration state of said mobile station in said first GSM/GPRS wireless system is no longer limited to a GPRS-only attachment; and transmitting, in response to said determination that the current registration state is no longer limited to a GPRS-only attachment, said first message to a mobile switching center of said first GSM/GPRS wireless system.

* * * * *